(12) United States Patent
Miyazoe et al.

(10) Patent No.: US 8,925,587 B2
(45) Date of Patent: Jan. 6, 2015

(54) PILOT-OPERATED THREE-POSITION SWITCHING VALVE

(75) Inventors: Shinji Miyazoe, Tsukubamirai (JP); Katsuyuki Senba, Tsukubamirai (JP)

(73) Assignee: SMC Corporation, Tokyo (JP)

( * ) Notice: Subject to any disclaimer, the term of this patent is extended or adjusted under 35 U.S.C. 154(b) by 391 days.

(21) Appl. No.: 13/414,166

(22) Filed: Mar. 7, 2012

(65) Prior Publication Data

US 2012/0255617 A1 Oct. 11, 2012

(30) Foreign Application Priority Data

Apr. 7, 2011 (JP) ................................ 2011-085447

(51) Int. Cl.
*F16K 11/07* (2006.01)
*F15B 13/04* (2006.01)
*F15B 13/043* (2006.01)

(52) U.S. Cl.
CPC ............. *F16K 11/07* (2013.01); *F15B 13/0402* (2013.01); *F15B 13/0431* (2013.01)
USPC ............ 137/625.69; 137/625.66; 137/596.14; 137/596.18

(58) Field of Classification Search
USPC ................. 137/625.2, 625.6, 625.64, 625.66, 137/625.27, 625.69, 596.16, 596.14, 596.18
See application file for complete search history.

(56) References Cited

U.S. PATENT DOCUMENTS

| | | | | |
|---|---|---|---|---|
| 2,775,982 A | * | 1/1957 | Canfield | 137/625.64 |
| 3,736,958 A | * | 6/1973 | Rostad | 137/625.64 |
| 3,774,641 A | * | 11/1973 | Mindner et al. | 137/625.64 |
| 4,718,451 A | * | 1/1988 | Kosugi | 137/596.16 |
| 5,868,157 A | * | 2/1999 | Yoshimura et al. | 137/625.64 |

(Continued)

FOREIGN PATENT DOCUMENTS

| | | |
|---|---|---|
| JP | 51-106891 | 9/1976 |
| JP | 57-70504 U | 4/1982 |

(Continued)

OTHER PUBLICATIONS

Office Action issued on Jul. 23, 2013 in the corresponding Japanese Design Application no. 2011-085447 (with English Translation).

(Continued)

*Primary Examiner* — Craig Schneider
*Assistant Examiner* — Craig J Price
(74) *Attorney, Agent, or Firm* — Oblon, Spivak, McClelland, Maier & Neustadt, L.L.P.

(57) ABSTRACT

Embodiments of the invention provide a first piston with a smaller diameter and a second piston with a larger diameter that switch a spool between a first switching position at one end and a second switching position at the other end, and a return spring that moves the spool to a neutral switching position are provided, at the neutral switching position, some of a plurality of ports communicate with one another and remaining ports are closed; at the first switching position, the communication-and-closure relationship of the plurality of ports is the reverse of that in the neutral switching position; and at the second switching position, all the plurality of ports are closed, and when the spool is switched to the neutral switching position and the first switching position, only the first piston is operated, and when the spool is switched to the second switching position, the second piston is operated.

11 Claims, 2 Drawing Sheets

(56) References Cited

U.S. PATENT DOCUMENTS

| | | |
|---|---|---|
| 5,992,460 A | 11/1999 | Akimoto |
| 6,109,298 A * | 8/2000 | Kaneko et al. ........... 137/625.64 |
| 7,207,351 B2 | 4/2007 | Hayashi et al. |

FOREIGN PATENT DOCUMENTS

| | | |
|---|---|---|
| JP | 59-190586 | 10/1984 |
| JP | 62-77378 U | 5/1987 |
| JP | 9-89135 A | 3/1997 |
| JP | 11-182728 | 7/1999 |
| KR | 10-2006-0087707 A | 8/2006 |

OTHER PUBLICATIONS

Office Action issued Jun. 24, 2013, in Korean Patent Application No. 10-2012-0034816 with English translation.

* cited by examiner

PILOT-OPERATED THREE-POSITION SWITCHING VALVE

BACKGROUND OF THE INVENTION

[1] Field of the Invention

The present invention relates to a pilot-operated three-position switching valve in which a spool is switched between three switching positions by a pilot fluid pressure and a return spring.

[2] Description of the Related Art

Pilot-operated three-position switching valves of this type have been known, as disclosed in, for example, Patent Literatures, Japanese Unexamined Patent Application Publication No. 59-190586 and Japanese Unexamined Patent Application Publication No. 11-182728. A known three-position switching valve is configured such that pistons are provided at both ends of a spool, which is slidably accommodated in a valve hole, a spring force of a return spring is applied the spool, the spool is moved in one direction and switched to a first switching position when a pilot fluid pressure is applied to one piston through one pilot valve, the spool is moved in the opposite direction and switched to a second switching position when a pilot fluid pressure is applied to the other piston through the other pilot valve, and the spool is switched to a neutral switching position by the return spring when both pilot valves are turned off and the pilot fluid pressure is removed from both pistons.

When the spool is switched to the first switching position, the switching valve goes into a first communication state in which some of a plurality of ports communicate with one another and the remaining ports are closed, when the spool is switched to the second switching position, the switching valve goes into a second communication state in which the communication-and-closure relationship of the plurality of ports is different from that in the first communication state, and when the spool is switched to the neutral switching position, the switching valve goes into a non-communication state in which all the ports are closed.

This is a so-called closed-center three-position switching valve, and its symbol is shown in FIG. 5. The three-position switching valve shown in FIG. 5 is a five-port switching valve.

BRIEF SUMMARY OF THE INVENTION

However, when the spool is switched between the first communication state and the second communication state in the above-mentioned conventional three-position switching valve, a control program for the pilot valves becomes complicated because a pilot fluid pressure needs to be applied alternately to the two pistons by alternately performing on-off control on the two solenoid-operated pilot valves. The control program becomes complicated particularly when a plurality of switching valves are simultaneously controlled, because the number of control points increases in proportion to the number of switching valves.

Furthermore, the power consumption is high because one of the pilot valves needs to be powered no matter what state, i.e., the first communication state or the second communication state, the spool is in.

Furthermore, when the spool is switched from the first communication state or the second communication state to the neutral switching position, where all the ports are closed for emergency stop, the response speed is a problem because the spool is moved to the neutral switching position only by an urging force of the return spring.

Hence, objects of the present invention are to simplify the control program for the pilot valves by enabling the operation to switch the spool between the first communication state and the second communication state to be performed by applying a pilot fluid pressure to or removing the pilot fluid pressure from only one piston, to reduce the power consumption, and to improve the responsiveness by performing an emergency stop operation by applying a pilot fluid pressure to the other piston.

In order to achieve the above-described object, the present invention provides a pilot-operated three-position switching valve including a valve body having a plurality of ports; a valve hole provided inside the valve body so as to communicate with the ports; a spool accommodated in the valve hole so as to be slidable in an axial direction and having three switching positions, namely, a first switching position at one end of the valve hole, a second switching position at the other end, and a neutral switching position between the first switching position and the second switching position; a first piston and a second piston that are disposed at one end and the other end of the spool and switch the spool between the first switching position and the second switching position when subjected to a pilot fluid pressure; and a return spring that returns the spool to the neutral switching position.

In the above-described three-position switching valve, the first piston has a smaller diameter than the second piston; the neutral switching position is such a switching position where a first communication state is established, in which some of the plurality of ports communicate with one another and the remaining ports are closed; the first switching position is such a switching position where a second communication state is established, in which the spool has been moved toward the second piston with a larger diameter by the first piston with a smaller diameter, and the communication-and-closure relationship of the plurality of ports is different from that in the first communication state; and the second switching position is such a switching position where the spool has been moved toward the first piston with a smaller diameter by the second piston with a larger diameter, and all the plurality of ports are closed and in a mutually non-communication state.

In the present invention, when no pilot fluid pressure is applied to the first piston or the second piston, the spool occupies the neutral switching position by the return spring; when a pilot fluid pressure is applied to the first piston with a smaller diameter and no pilot fluid pressure is applied to the second piston with a larger diameter, the spool is switched to the first switching position by the first piston; and when a pilot fluid pressure is applied to the second piston with a larger diameter, the spool is switched to the second switching position by the second piston, regardless of whether or not the pilot fluid pressure is applied to the first piston with a smaller diameter.

In the present invention, it is preferable that the plurality of ports include a supply port at the center, a first output port and a second output port on both sides of the supply port, and a first discharge port and a second discharge port on the outer sides of the first output port and the second output port; the spool include two sealing seal members that are provided at positions near the ends of the spool to always close the ends of the valve hole and six (from first to sixth) open/close seal members that open or close flow paths that connect adjacent ports; and the six open/close seal members be disposed so as to occupy asymmetric positions between the two sealing seal members.

In this case, the first and second open/close seal members open or close a first discharge flow path connecting the first output port and the first discharge port, the third open/close seal member opens or closes a first output flow path connecting the supply port and the first output port, the fourth and fifth open/close seal members open or close a second output flow path connecting the supply port and the second output port, and the sixth open/close seal member opens or closes a second discharge flow path connecting the second output port and the second discharge port.

Furthermore, the present invention may be configured such that a small-diameter portion is formed at a part of the spool, a pair of ring-shaped spring seats are fitted to the small-diameter portion so as to be movable in an axial direction of the spool, the return spring having a coil shape is provided between the pair of spring seats, a fitting groove having the same axial length as the axial length of the small-diameter portion is formed in the inner periphery of the valve body so as to surround the small-diameter portion, the spring seats are fitted to the fitting groove, and, when the spool is located at the neutral switching position, one of the spring seats engages with end walls of the small-diameter portion and the fitting groove at one side, and the other of the spring seats engages with the end walls of the small-diameter portion and the fitting groove at the other side.

The small-diameter portion, the pair of spring seats, the return spring, and the fitting groove are disposed at positions close to the second piston with a larger diameter or at positions close to the first piston with a smaller diameter.

Furthermore, the present invention provides a method of operating the above-described three-position switching valve. This method includes providing a first pilot valve that drives the first piston, and a second pilot valve that drives the second piston; operating only the first piston with a smaller diameter by the first pilot valve when the plurality of ports are switched to the first communication state and the second communication state by moving the spool to the neutral switching position and to the first switching position; and operating the second piston with a larger diameter when all the plurality of ports are switched to the non-communication state, or a closed state, by moving the spool to the second switching position by the second pilot valve.

As has been described, with the present invention, because the operation to switch the spool between the first communication state and the second communication state can be performed by applying a pilot fluid pressure to or removing the pilot fluid pressure from only one piston, the control program for the pilot valves can be simplified, and the power consumption can also be reduced. Furthermore, because the emergency stop operation is performed by applying a pilot fluid pressure to the second piston with a larger diameter to switch the spool, the responsiveness is improved compared with the case where the spool is switched by the spring force of the return spring.

DETAILED DESCRIPTION OF THE INVENTION

Figure 1:
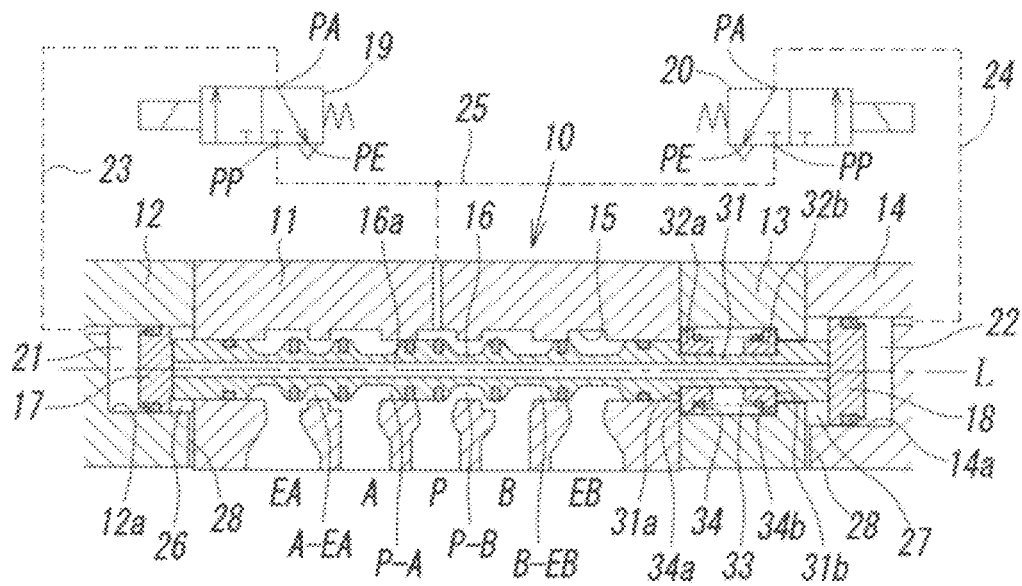
FIG. 1 is a cross-sectional view of an embodiment of a pilot-operated three-position switching valve of the present invention, showing a state in which a spool is located at a neutral switching position.
Figure 2:
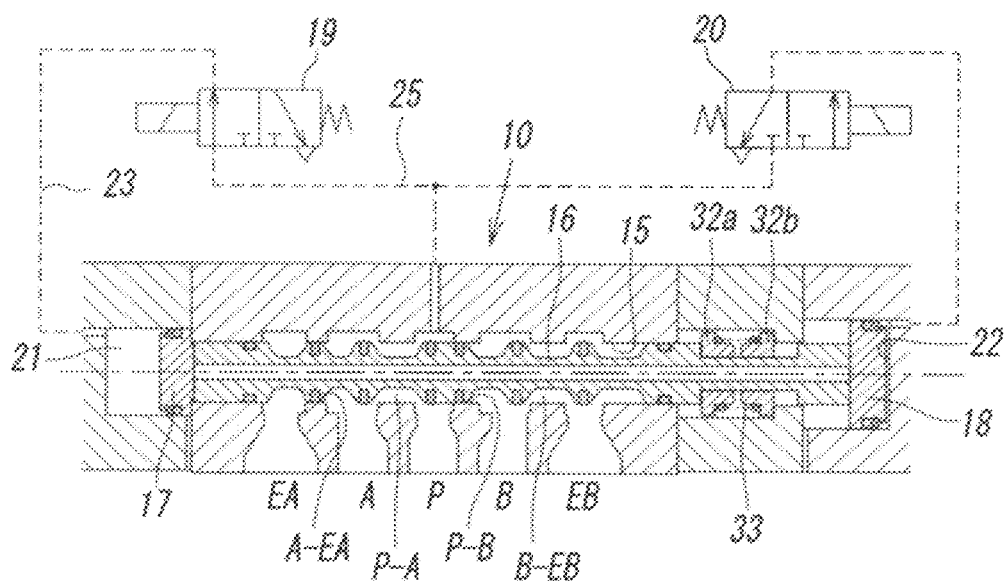
FIG. 2 is a cross-sectional view of the pilot-operated three-position switching valve in FIG. 1, showing a state in which the spool is located at a first switching position.
Figure 3:
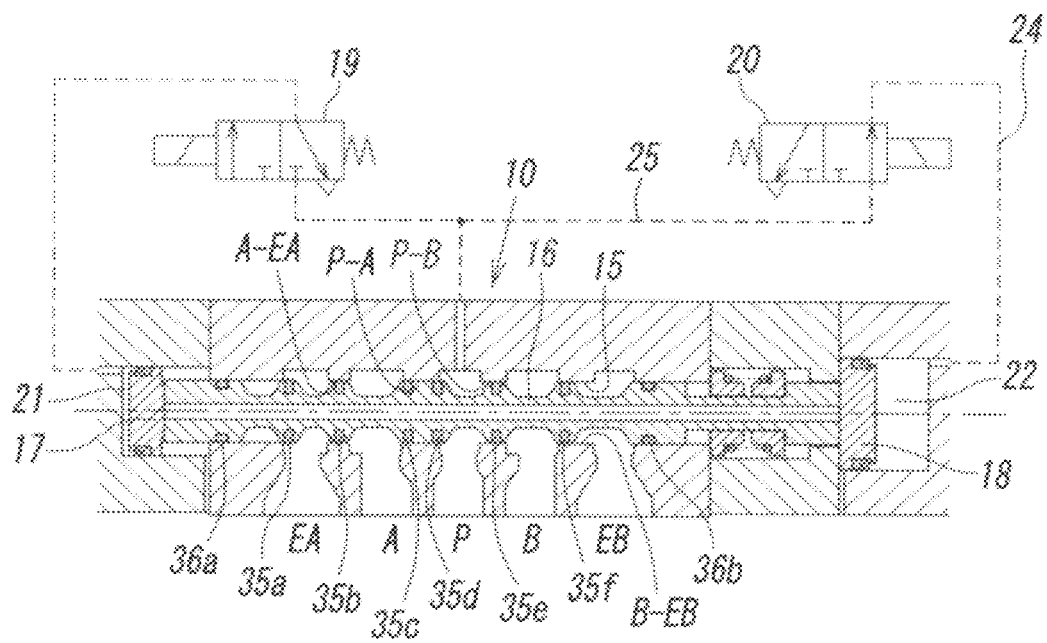
FIG. 3 is a cross-sectional view of the pilot-operated three-position switching valve in FIG. 1, showing a state in which the spool is located at a second switching position.
Figure 4:
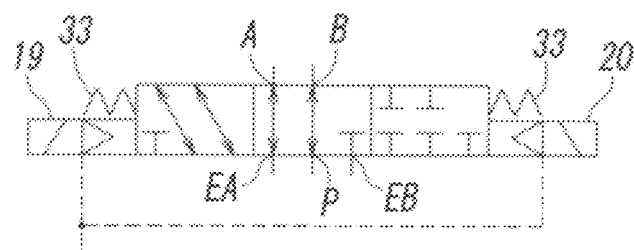
FIG. 4 is a diagram showing a symbol of the pilot-operated three-position switching valve in FIG. 1.
Figure 5:
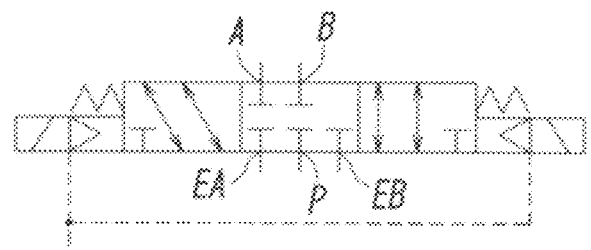
FIG. 5 is a diagram showing a symbol of the conventional pilot-operated three-position switching valve.

FIGS. 1 to 3 show the specific configuration of a pilot-operated three-position switching valve of the present invention, and FIG. 4 shows the symbol of this three-position switching valve. This three-position switching valve has a five-port valve configuration.

In FIGS. 1 to 3, a valve body 10 of the three-position switching valve includes a main body 11 having a plurality of ports P, A, B, EA, and EB; a first piston cover 12 connected to an end of the main body 11; and a spring cover 13 and a second piston cover 14, which are serially connected to the other end of the main body 11.

The plurality of ports include the supply port P at the center, the first output port A and the second output port B located on both sides of the supply port P, the first discharge port EA located on the first piston cover 12 side of the first output port A, and the second discharge port EB located on the second piston cover 14 side of the second output port B. These five ports are located at asymmetric positions with respect to the supply port P and communicate with a valve hole 15.

The circular valve hole 15 communicating with the ports is formed in the main body 11 and the spring cover 13 so as to continuously penetrate the main body 11 and the spring cover 13, and a spool 16 having a through-hole 16a at the center is inserted into the valve hole 15 so as to be slidable in an axial direction L of the valve hole 15. One end and the other end of the spool 16 extend to piston chambers 12a and 14a inside the first piston cover 12 and the second piston cover 14 and are in contact with or connected to a first piston 17 and a second piston 18 slidably accommodated in the piston chambers 12a and 14a, respectively.

The first piston 17 and the second piston 18 switch the spool 16 between a first switching position in FIG. 2 and a second switching position in FIG. 3 when subjected to pilot fluid pressure. The first piston 17 has a smaller diameter than the second piston 18, and a pressure-receiving surface of the first piston 17 with a smaller diameter faces a first pilot chamber 21 with a smaller diameter, and a pressure-receiving surface of the second piston 18 with a larger diameter faces a second pilot chamber 22 with a larger diameter.

The first pilot chamber 21 is connected to a pilot output port PA of a first pilot valve 19, which is composed of a three-port solenoid valve, through a first pilot output path 23, and the second pilot chamber 22 is connected to a pilot output port PA of a second pilot valve 20, which is composed of a three-port solenoid valve, through a second pilot output path 24, and pilot supply ports PP of the pilot valves 19 and 20 are connected to the supply port P through a pilot supply path 25. Furthermore, pilot discharge ports PE of the pilot valves 19 and 20 are open to the atmosphere.

The first pilot valve 19 and the second pilot valve 20 are attached to the end surfaces of the first piston cover 12 and the second piston cover 14, and the first pilot output path 23, the second pilot output path 24, and the pilot supply path 25 are formed inside the valve body 11.

Furthermore, a rear chamber 26 facing the back surface of the first piston 17 and a rear chamber 27 facing the back surface of the second piston 18 communicate with each other through the through-hole 16a in the spool 16, and gaps and grooves formed between the end surfaces of the spool 16 and the back surfaces of the pistons, and are open to the atmosphere through open paths 28.

As shown in FIG. 2, when the first pilot valve 19 is turned on and the pilot fluid is supplied from the supply port P to the first pilot chamber 21, and when the second pilot valve 20 is turned off and the second pilot chamber 22 is opened to the atmosphere, because the first piston 17 is pressed toward the second piston 18 by the pilot fluid pressure, the spool 16 is moved toward the second piston 18 through the valve hole 15 and switched to the first switching position.

Furthermore, as shown in FIG. 3, when the second pilot valve 20 is turned on and the pilot fluid is supplied from the supply port P to the second pilot chamber 22 and when the first pilot valve 19 is turned off and the first pilot chamber 21 is opened to the atmosphere, because the second piston 18 is pressed toward the first piston 17 by the pilot fluid pressure, the spool 16 is moved toward the first piston 17 through the valve hole 15 and switched to the second switching position. However, because the pressure-receiving area of the second piston 18 is larger than the pressure-receiving area of the first piston 17, even when a pilot fluid pressure is applied to the first piston 17 while the first pilot valve 19 is turned on, the spool 16 is switched to the second switching position because of the difference in force of the fluid pressure applied to the pistons 17 and 18.

The spool 16 is provided with a small-diameter portion 31 at a part penetrating the spring cover 13, and a pair of ring-shaped spring seats 32a and 32b is fitted to the small-diameter portion 31 so as to be movable in the axial direction L of the spool 16. A compressed coil-shaped return spring 33 is provided between the pair of spring seats 32a and 32b.

On the other hand, a fitting groove 34 having the same axial length (groove width) as the axial length of the small-diameter portion 31 is formed in the inner periphery of the spring cover 13 so as to surround the small-diameter portion 31, and part of the outer peripheries of the spring seats 32a and 32b fits into the fitting groove 34. When the spool 16 is located at the neutral switching position in FIG. 1, one of the spring seats, namely, the first spring seat 32a, engages with end walls 31a and 34a of the small-diameter portion 31 and the fitting groove 34 at one side, and the other of the spring seats, namely, the second spring seat 32b, engages with the end walls 31b and 34b of the small-diameter portion 31 and the fitting groove 34 at the other side. In other words, when no pilot fluid pressure is applied to the first piston 17 or the second piston 18, the two spring seats 32a and 32b are urged by the urging force of the return spring 33 and engage with the end walls 31a and 34a at one side and the end walls 31b and 34b at the other side of the small-diameter portion 31 and the fitting groove 34, thereby switching the spool 16 to the neutral switching position shown in FIG. 1.

As shown in FIG. 1, when the spool 16 is switched to the neutral switching position by the return spring 33, the three-position switching valve goes into the first communication state, in which the supply port P communicates with the second output port B, the first output port A communicates with the first discharge port EA, and the second discharge port EB is closed.

Furthermore, as shown in FIG. 2, when the spool 16 is switched to the first switching position by the first piston 17, the three-position switching valve goes into the second communication state, in which the supply port P communicates with the first output port A, the second output port B communicates with the second discharge port EB, and the first discharge port EA is closed.

Furthermore, as shown in FIG. 3, when the spool 16 is switched to the second switching position by the second piston 18, all the flow paths that connect adjacent ports in the three-position switching valve are closed, and the ports are in mutually non-communication state.

Therefore, as can be seen from FIG. 3, the spool 16 is provided with six (from first to sixth) open/close seal members 35a to 35f that open or close the flow paths that connect adjacent ports, and two sealing seal members 36a and 36b that always seal the ends of the valve hole 15.

The six open/close seal members (hereinbelow, simply, "seal members") 35a to 35f are disposed between the two sealing seal members 36a and 36b in sequence, such that the seal member located at a position closest to the first piston 17 is the first seal member 35a and the seal member located at a position closest to the second piston 18 is the sixth seal member 35f, and such that they occupy asymmetric positions with respect to the middle position between the two sealing seal members 36a and 36b. The first, third, fourth, and sixth seal members 35a, 35c, 35d, and 35f open or close the flow paths between adjacent ports when the spool 16 is alternately switched between the neutral switching position and the first switching position, and the second to sixth seal members 35b to 35f close all the flow paths between adjacent ports when the spool 16 is switched to the second switching position.

More specifically, the first seal member 35a and the second seal member 35b open or close a first discharge flow path A-EA connecting the first output port A and the first discharge port EA, at least the third seal member 35c of the third seal member 35c and the fourth seal member 35d opens or closes a first output flow path P-A connecting the supply port P and the first output port A, the fourth seal member 35d and the fifth seal member 35e open or close a second output flow path P-B connecting the supply port P and the second output port B, and the sixth seal member 35f opens or closes a second discharge flow path B-EB connecting the second output port B and the second discharge port EB.

When the spool 16 is located at the neutral switching position, the first output flow path P-A is closed by the third seal member 35c, the second discharge flow path B-EB is closed by the sixth seal member 35f, and the second output flow path P-B and the first discharge flow path A-EA are open.

Furthermore, when the spool 16 is located at the first switching position, the first discharge flow path A-EA is closed by the first seal member 35a, the second output flow path P-B is closed by the fourth seal member 35d, and the first output flow path P-A and the second discharge flow path B-EB are open.

Furthermore, when the spool 16 is located at the second switching position, the first and second output flow paths P-A and P-B, and the first and second discharge flow paths A-EA and B-EB are all closed by the second to sixth seal members 35b to 35f.

On the other hand, the two sealing seal members 36a and 36b always seal the ends of the valve hole 15 regardless of which switching position the spool 16 is in.

The thus-configured three-position switching valve can switch the flow paths between the ports P, A, B, EA, and EB by applying a pilot fluid pressure to or removing the pilot fluid pressure from the first piston 17 with a smaller diameter by alternately turning on and off only the first pilot valve 19, while the second pilot valve 20 is turned off so as not to apply a pilot fluid pressure to the second piston 18 with a larger diameter.

More specifically, when the second pilot valve 20 is in an off state and the first pilot valve 19 is also in an off state, as shown in FIG. 1, the spool 16 is returned by the urging force of the return spring 33 and occupies the neutral switching position, and the ports P, A, B, EA, and EB are in the first communication state. When power is supplied to the first pilot valve 19 from this state, a pilot fluid pressure is applied to the first piston 17, switching the spool 16 to the first switching position, as shown in FIG. 2, and the ports P, A, B, EA, and EB are in the second communication state. When the supply of power to the first pilot valve 19 is stopped, the spool 16 is returned to the neutral switching position, as shown in FIG. 1, by the urging force of the return spring 33, and the ports P, A, B, EA, and EB are in the first communication state.

On the other hand, when the fluid pressure device is subjected to an emergency stop during the operation, power is supplied to the second pilot valve 20 to apply a pilot fluid pressure to the second piston 18. As a result, the spool 16 is switched to the second switching position by the second piston 18, as shown in FIG. 3, and the ports P, A, B, EA, and EB are in the non-communication state. Because the pressure-receiving area of the second piston 18 is larger than the pressure-receiving area of the first piston 17, this emergency stop operation can be performed when the first pilot valve 19 is in an off state and the spool 16 is in the neutral switching position, as shown in FIG. 1, as well as when the first pilot valve 19 is in an on state and the spool 16 occupies the first switching position, as shown in FIG. 2.

As has been described above, in the three-position switching valve, because the operation to switch the spool 16 between the first communication state and the second communication state can be performed by applying a pilot fluid pressure to or removing the pilot fluid pressure from only the first piston 17 with a smaller diameter, not only can the control program for the pilot valves 19 and 20 be simplified, but also can the power consumption be reduced. Furthermore, because the emergency stop operation is performed by switching the spool 16 by applying a pilot fluid pressure to the second piston 18 with a larger diameter, the responsiveness is improved compared with the case where the spool 16 is switched by the spring force of the return spring 33.

Although the spring cover 13, the small-diameter portion 31, the spring seats 32a and 32b, and the return spring 33 are disposed at positions close to the second piston 18 with a larger diameter in the example shown, these components may be disposed at positions close to the first piston 17 with a smaller diameter.

Furthermore, although the three-position switching valve shown is configured as a five-port valve, the present invention may also be applied to a three-position switching valve composed of a three-port valve or a four-port valve.

The invention claimed is:

1. A pilot-operated three-position switching valve comprising:
a valve body having a plurality of ports;
a valve hole provided inside the valve body so as to communicate with the ports;
a spool accommodated in the valve hole so as to be slidable in an axial direction and having three switching positions, namely, a first switching position at one end of the valve hole, a second switching position at the other end, and a neutral switching position between the first switching position and the second switching position;
a first piston and a second piston that are disposed at one end and the other end of the spool and switch the spool between the first switching position and the second switching position when subjected to a pilot fluid pressure; and
a return spring that returns the spool to the neutral switching position,
wherein the first piston has a smaller diameter than the second piston,
wherein the neutral switching position is such a switching position where a first communication state is established, in which some of the plurality of ports communicate with one another and other remaining ports of the plurality of ports are closed,
wherein the first switching position is such a switching position where a second communication state is established, in which the spool has been moved toward the second piston with a larger diameter by the first piston with the smaller diameter, and the communication-and-closure relationship of the plurality of ports is different from that in the first communication state, and
wherein the second switching position is such a switching position where the spool has been moved toward the first piston with the smaller diameter by the second piston with the larger diameter, and all the plurality of ports are closed and in a mutually non-communication state.

2. The pilot-operated three-position switching valve according to claim 1,
wherein, when no pilot fluid pressure is applied to the first piston or the second piston, the spool occupies the neutral switching position by the return spring,
wherein, when a pilot fluid pressure is applied to the first piston with the smaller diameter and no pilot fluid pressure is applied to the second piston with the larger diameter, the spool is switched to the first switching position by the first piston, and
wherein, when a pilot fluid pressure is applied to the second piston with the larger diameter, the spool is switched to the second switching position by the second piston, regardless of whether or not the pilot fluid pressure is applied to the first piston with the smaller diameter.

3. The pilot-operated three-position switching valve according to claim 1,
wherein the plurality of ports include a supply port at a center, a first output port and a second output port on both sides of the supply port, a first discharge port and a second discharge port on outer sides of the first output port and the second output port,
wherein the spool includes two sealing seal members that are provided at ends of the spool to always close the ends of the valve hole, and six open/close seal members that open or close flow paths that connect adjacent ports, and
wherein the six open/close seal members are disposed so as to occupy asymmetric positions between the two sealing seal members.

4. The pilot-operated three-position switching valve according to claim 3, wherein the first and second open/close seal members open or close a first discharge flow path connecting the first output port and the first discharge port, the third open/close seal member opens or closes a first output flow path connecting the supply port and the first output port, the fourth and fifth open/close seal members open or close a second output flow path connecting the supply port and the second output port, and the sixth open/close seal member opens or closes a second discharge flow path connecting the second output port and the second discharge port.

5. The pilot-operated three-position switching valve according to claim 1, wherein a small-diameter portion is formed at a part of the spool, a pair of ring-shaped spring seats are fitted to the small-diameter portion so as to be movable in an axial direction of the spool, the return spring having a coil shape is provided between the pair of spring seats, a fitting groove having the same axial length as the axial length of the small-diameter portion is formed in the inner periphery of the valve body so as to surround the small-diameter portion, the spring seats are fitted to the fitting groove, and, when the spool is located at the neutral switching position, one of the spring seats engages with one of end walls of each of the small-diameter portion and the fitting groove, and the other of the spring seats engages with the other of end walls of each of the small-diameter portion and the fitting groove.

6. The pilot-operated three-position switching valve according to claim 3, wherein a small-diameter portion is formed at a part of the spool, a pair of ring-shaped spring seats are fitted to the small-diameter portion so as to be movable in an axial direction of the spool, the return spring having a coil shape is provided between the pair of spring seats, a fitting groove having the same axial length as the axial length of the small-diameter portion is formed in the inner periphery of the valve body so as to surround the small-diameter portion, the spring seats are fitted to the fitting groove, and, when the spool is located at the neutral switching position, one of the spring seats engages with one of end walls of each of the small diameter portion and the fitting groove, and the other of the spring seats engages with the other of end walls of each of the small-diameter portion and the fitting groove.

7. The pilot-operated three-position switching valve according to claim 5, wherein the small-diameter portion, the pair of spring seats, the return spring, and the fitting groove are disposed at positions close to the second piston with the larger diameter.

8. The pilot-operated three-position switching valve according to claim 6, wherein the small-diameter portion, the pair of spring seats, the return spring, and the fitting groove are disposed at positions close to the second piston with the larger diameter.

9. The pilot-operated three-position switching valve according to claim 5, wherein the small-diameter portion, the pair of spring seats, the return spring, the fitting groove are disposed at positions close to the first piston with the smaller diameter.

10. The pilot-operated three-position switching valve according to claim 6, wherein the small-diameter portion, the pair of spring seats, the return spring, the fitting groove are disposed at positions close to the first piston with the smaller diameter.

11. A method of operating the pilot-operated three-position switching valve according to claim 1, comprising: providing a first pilot valve that drives the first piston, and a second pilot valve that drives the second piston; operating only the first piston with the smaller diameter by the first pilot valve when the plurality of ports are switched to the first communication state and the second communication state by moving the spool to the neutral switching position and the first switching position; and operating the second piston with the larger diameter by the second pilot valve when all the plurality of ports are switched to the non-communication state, or a closed state, by moving the spool to the second switching position.

* * * * *